US010255344B2

(12) United States Patent
Srinivasan

(10) Patent No.: US 10,255,344 B2
(45) Date of Patent: Apr. 9, 2019

(54) MULTI-TENANT DATA INTEGRATION

(71) Applicant: [24]7.ai, Inc., San Jose, CA (US)

(72) Inventor: Suresh Srinivasan, Alameda, CA (US)

(73) Assignee: [24]7.ai, Inc., San Jose, CA (US)

( * ) Notice: Subject to any disclaimer, the term of this patent is extended or adjusted under 35 U.S.C. 154(b) by 0 days.

(21) Appl. No.: 13/908,948

(22) Filed: Jun. 3, 2013

(65) Prior Publication Data
US 2013/0325790 A1 Dec. 5, 2013

Related U.S. Application Data

(60) Provisional application No. 61/655,396, filed on Jun. 4, 2012.

(51) Int. Cl.
G06F 17/30 (2006.01)

(52) U.S. Cl.
CPC .... *G06F 17/30592* (2013.01); *G06F 17/3056* (2013.01)

(58) Field of Classification Search
CPC ......... G06F 17/30654; G06F 17/30864; G06F 17/30592; G06F 17/3056
USPC ........................................................ 707/722
See application file for complete search history.

(56) References Cited

U.S. PATENT DOCUMENTS

| | | | |
|---|---|---|---|
| 6,532,465 B2 | 3/2003 | Hartley et al. | |
| 6,594,786 B1 | 7/2003 | Connelly et al. | |
| 8,180,332 B2 | 5/2012 | Ramer et al. | |
| 8,244,759 B2 * | 8/2012 | Brooks | G06F 8/68 707/782 |
| 8,504,556 B1 * | 8/2013 | Rice | G06F 17/3056 707/713 |
| 2002/0042921 A1 * | 4/2002 | Ellis | 725/87 |
| 2005/0027559 A1 | 2/2005 | Rajan et al. | |
| 2005/0188345 A1 | 8/2005 | Chang et al. | |
| 2005/0228808 A1 * | 10/2005 | Mamou et al. | 707/100 |
| 2006/0031225 A1 * | 2/2006 | Palmeri et al. | 707/10 |
| 2006/0161513 A1 * | 7/2006 | Drumm et al. | 707/1 |
| 2007/0185902 A1 * | 8/2007 | Messinger et al. | 707/103 R |
| 2008/0028068 A1 | 1/2008 | Nochta et al. | |
| 2009/0187970 A1 | 7/2009 | Mower et al. | |
| 2010/0063959 A1 * | 3/2010 | Doshi | G06F 17/30575 707/618 |
| 2010/0161648 A1 * | 6/2010 | Eberlein | G06F 17/30525 707/769 |
| 2011/0282969 A1 * | 11/2011 | Iyer | G06F 17/3056 709/217 |
| 2012/0059795 A1 | 3/2012 | Hersh et al. | |
| 2012/0174064 A1 * | 7/2012 | Polly | G06Q 10/10 717/120 |
| 2012/0197948 A1 * | 8/2012 | Tsai et al. | 707/803 |
| 2012/0324069 A1 * | 12/2012 | Nori | H04L 41/0806 709/222 |
| 2013/0031496 A1 * | 1/2013 | Mathrubootham | G06F 3/048 715/764 |

(Continued)

OTHER PUBLICATIONS

"Oracle Fusion Middleware Concepts Guide", 11g Release 1 (11.1.1), E10103-03, Jan. 2010, 76 pages.

*Primary Examiner* — Hicham Skhoun
(74) *Attorney, Agent, or Firm* — Perkins Coie LLP

(57) ABSTRACT

An enterprise application integration system (EAIS) is disclosed that enables customer service applications to access and share data with enterprise information systems in real time.

27 Claims, 11 Drawing Sheets

(56) References Cited

U.S. PATENT DOCUMENTS

| | | | |
|---|---|---|---|
| 2013/0191494 A1* | 7/2013 | Sidhu | H04L 67/34 709/217 |
| 2013/0238641 A1* | 9/2013 | Mandelstein et al. | 707/756 |
| 2013/0238729 A1* | 9/2013 | Holzman et al. | 709/206 |
| 2013/0275695 A1* | 10/2013 | Ponsford et al. | 711/162 |
| 2013/0304431 A1* | 11/2013 | Kannegala | G06Q 10/00 703/2 |
| 2013/0318152 A1* | 11/2013 | Iyer et al. | 709/203 |

* cited by examiner

MULTI-TENANT DATA INTEGRATION

CROSS REFERENCE TO RELATED APPLICATIONS

This application claims priority to U.S. provisional patent application Ser. No. 61/655,396, filed Jun. 4, 2012, which application is incorporated herein in its entirety by this reference thereto.

BACKGROUND OF THE INVENTION

Technical Field

The invention relates to a system and architecture that enables customer service applications to access and share data with enterprise information systems in real time.

Description of the Background Art

To automate customer service functions, business applications need to exchange data with a variety of enterprise information systems, such as: customer relationship management systems (for managing customer profiles and transactions), supply chain management systems (for managing logistics and procurement), order entry systems, and e-commerce systems. Enterprise Application Integration (EAI) tools have emerged to enable business applications to connect and share data with multiple information systems. These tools shield applications from the development and maintenance burden required to link data across systems that use different data structures, run on different architectures, or are provided by different vendors.

Current EAI tools have a number of limitations. These tools are heavyweight, requiring specialized staff for system administration. They may not use business objects or, if they use business objects, these business objects are vendor-specific, or are limited to business objects from one specific business vertical, e.g. health care, travel, insurance, etc. As a result, these tools facilitate integration with information systems from only a single vendor or a specific vertical. These tools are low-level; they essentially comprise a programming model and a development kit that provides only basic building blocks. Current tools will support a pre-defined set of data protocols, and cannot be easily extended to handle custom protocols. These tools do not monitor and adapt their operation to the quality of service of the connected enterprise information systems. Also, current tools were designed and architected for single-tenant use, and force the deployment of multiple instances to handle multi-tenant applications.

SUMMARY OF THE INVENTION

Embodiments of the herein disclosed invention provide an enterprise application integration system (EAIS) that has improved functionality. Also disclosed herein is a system and method for supporting multi-tenants from a single EAIS. Further disclosed herein is an EAIS that provides services in different business verticals. Further disclosed herein is a system and method for creating objects which are an abstraction of a business flow, and which enable the EAIS to reuse objects to serve customers quickly.

DETAILED DESCRIPTION OF THE INVENTION

Embodiments of the invention enable an enterprise application integration systems (EAIS) to serve different business verticals of same client or different clients, i.e. multi-tenancy.

In one embodiment, the invention enables applications to interact with information systems through business objects, which are a high level abstraction of a business entity, including its data structure and associated business logic. Such business objects can be created in an EAIS and can be reused across applications.

In an yet another embodiment of the invention, custom protocol and data formats are created in an EAIS or added to an EAIS to extend the capability of the EAIS when interacting with information systems that have different data formats.

Figure 1:
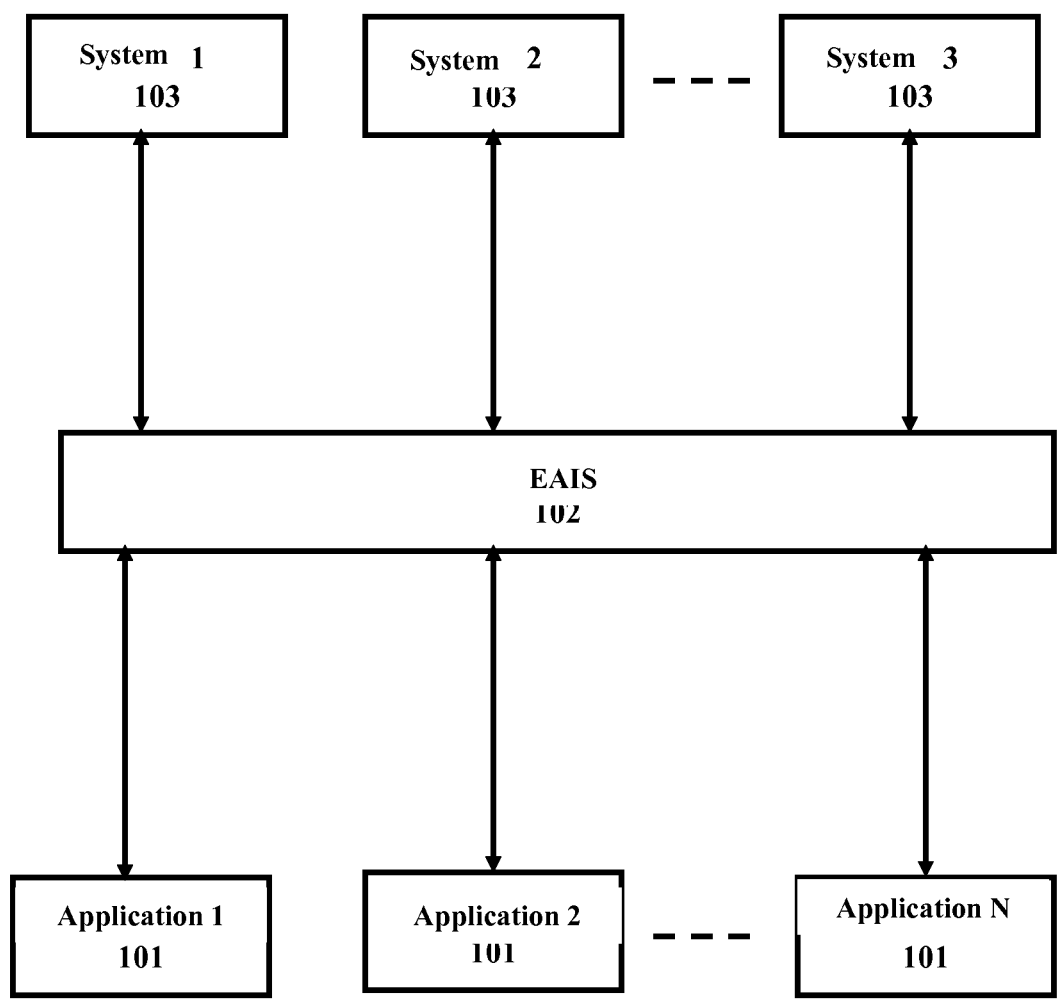
FIG. 1 is a block schematic diagram that shows a system according to the invention.

FIG. 1 is a block schematic diagram that shows a system according to the invention. The system comprises a plurality of business applications 101 (Application 1, Application 2, . . . , Application n), an EAIS 102, and a plurality of enterprise information systems 103 (System 1, System 2, . . . , System 3) that serve the applications.

The EAIS serves as a middleware between applications and enterprise information systems. The EAIS performs multiple tasks on behalf of applications related to accessing or updating data, which can include fetching a customer's profile details, such as their account number, address, preferences, interaction history, etc.; validating a customer's identity; obtaining the logic and rules for implementing a business workflow; sending the context of a customer interaction in preparation for a transfer to a human agent; and so on.

Figure 2:
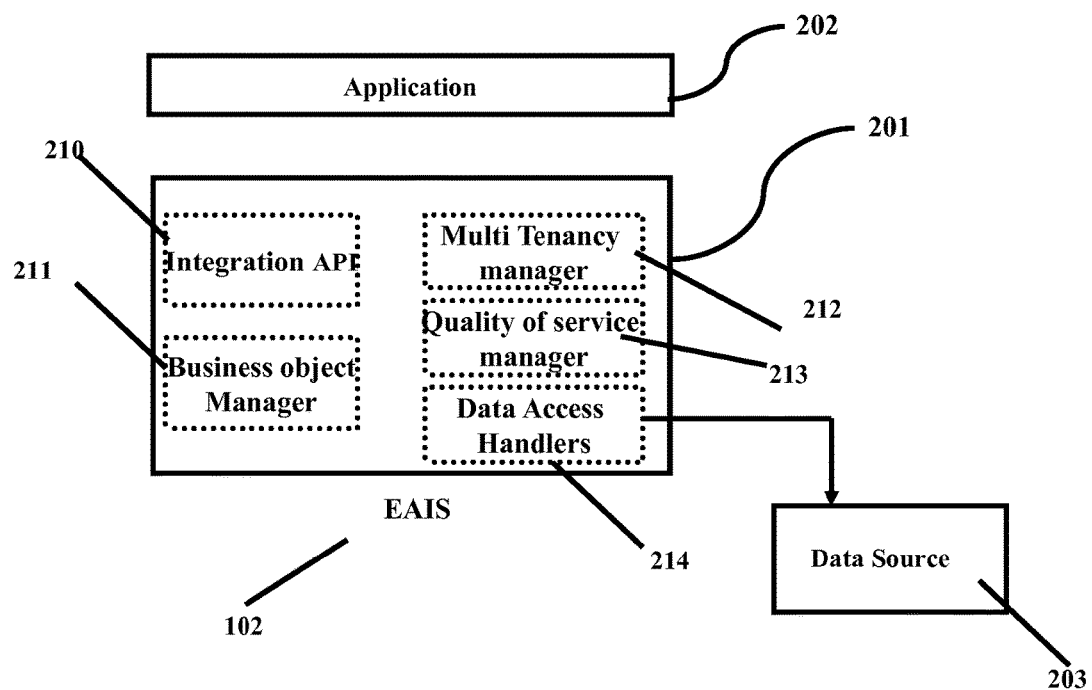
FIG. 2 is a block schematic diagram that shows an EAIS according to the invention.

FIG. 2 is a block schematic diagram that shows an EAIS 102 according to the invention. The system comprises a business application 202; an EAIS 201 that comprises an integration API 210, a business object manager 211, a multi-tenancy manager 212, a quality of service manager 213, and data access handlers 214; and a data source 203.

The application 202 uses the services of the EAIS to access and share data with one or more enterprise information systems and their associated data sources.

In one embodiment of the invention, the EAIS provides an integration API 210 for applications to interact with information systems through business objects. This API enables a business application to retrieve, update, or execute operations on a business object.

Business objects are used to represent enterprise data across different information systems in a standardized way. Business applications interact with business objects via logical operations, which are mapped by the EAIS to physical operations specific to each information system. As a result, application logic is shielded from changes to the source information systems. For example, the following Java code shows the retrieval of a list of nearby stores using the business object "Store" according to one embodiment of the invention. In this example, the application is isolated from the technical details of interacting with the data source that maintains the stores, which may comprise files, databases, Web services, application interfaces or other data systems.

```
// Locate stores for a retailer in the
// given latitude, longitude.
List<Store> stores =
    store.getNearbyStores(0.0, 180.0, -180.0, 180.0);
```

The business object manager (BOM) 211 enables the definition of business objects that are maintained in the business object repository. Business objects can be organized by application type, tenant, vertical, or other attributes that are useful to the application developer. The BOM provides a discovery mechanism that allows an application developer to browse or search for business objects in the business object repository, and then allows the developer to choose the business objects to be used in the application based on its requirements.

In one embodiment of the invention, applications belonging to different companies are supported by the same EAIS with the help of the multi-tenancy manager 213. For purposes of the discussion herein, multi-tenancy refers to a principle in software architecture where a single instance of the software runs on a server, serving multiple client organizations (tenants). Multi-tenancy is contrasted with a multi-instance architecture where separate software instances or hardware systems are set up for different client organizations. With a multi-tenant architecture, a software application is designed to partition its data and configuration virtually, and each client organization works with a customized virtual application instance. Multi-tenancy is also regarded as one of the essential attributes of cloud computing. More specifically, in connection with embodiments of the invention, multi-tenancy occurs where business applications that belong to different businesses are accommodated simultaneously, each application being isolated to only the services relevant to them. In one embodiment of the invention, the system administrator can add a new tenant or remove an existing tenant. In another embodiment, the EAIS is dedicated to serve only one tenant.

The data access handlers 214 (DAH) interact with different information systems and their associated data sources, such as files, databases, Web services, application interfaces. The data sources can be heterogeneous in nature. The DAH collects data according to the customer's requirements. In one embodiment of the invention, the DAH caches data that does not change frequently, such that it is easy and quick to serve customers as and when they request that data. In one embodiment of the invention, the DAH converts one data type to another data type, for example XML to comma-separated values, so that the DAH can interact with different data types, collect data, and convert the data into the format the customer requires. In another embodiment of the invention, new data formats can be added into the DAH as and when a new format is available in the market, such that that DAH is able to access data in all formats and present it to the customer.

The quality of services manager (QOS) 213 helps in improving the quality of services that are provided to the business application. The QOS tests the functionality of different enterprise information systems periodically to determine operational performance, such as responsiveness, availability, and reliability. In one embodiment of the invention, the QOS provides an interface to monitor and view the quality and performance of data requests made by applications that use the EAIS. For example, the QOS can report on the number of data requests made by applications, the number of successful and unsuccessful responses from information systems, and the average response times categorized by any combination of the following variables: application, information system, tenant, business object, and time period.

In another embodiment of the invention, the QOS implements rate limit access to ensure that the enterprise information system is protected from excessive rates of access, which might otherwise impact the information system response time. In another embodiment of the invention, the QOS retries failed operations a number of times, up to a defined limit, thus allowing resilient access to information systems facing intermittent issues such as transient network hiccups. In an embodiment of the invention, the QOS implements a proactive heartbeat mechanism that allows an application to determine a priori whether an information system is reachable. According to one embodiment of the invention, an information system is considered to be unreachable when it fails to respond to data requests within a predetermined time, also known as a time out. If the information system is unreachable, the application can adapt its behavior, e.g. by informing an end user of an outage or by using an alternative process to complete a desired transaction, thus maintaining a high quality customer experience. In one embodiment of the invention, the QOS can quickly fail over to alternate enterprise information system to access data when one enterprise system is unreachable. Control for quality of service features such as rate limit access, retries, proactive heartbeat, time out limits, and fail over mechanisms can be adjusted on any of per-application, per-tenant, per business object, and per information system.

Figure 3:
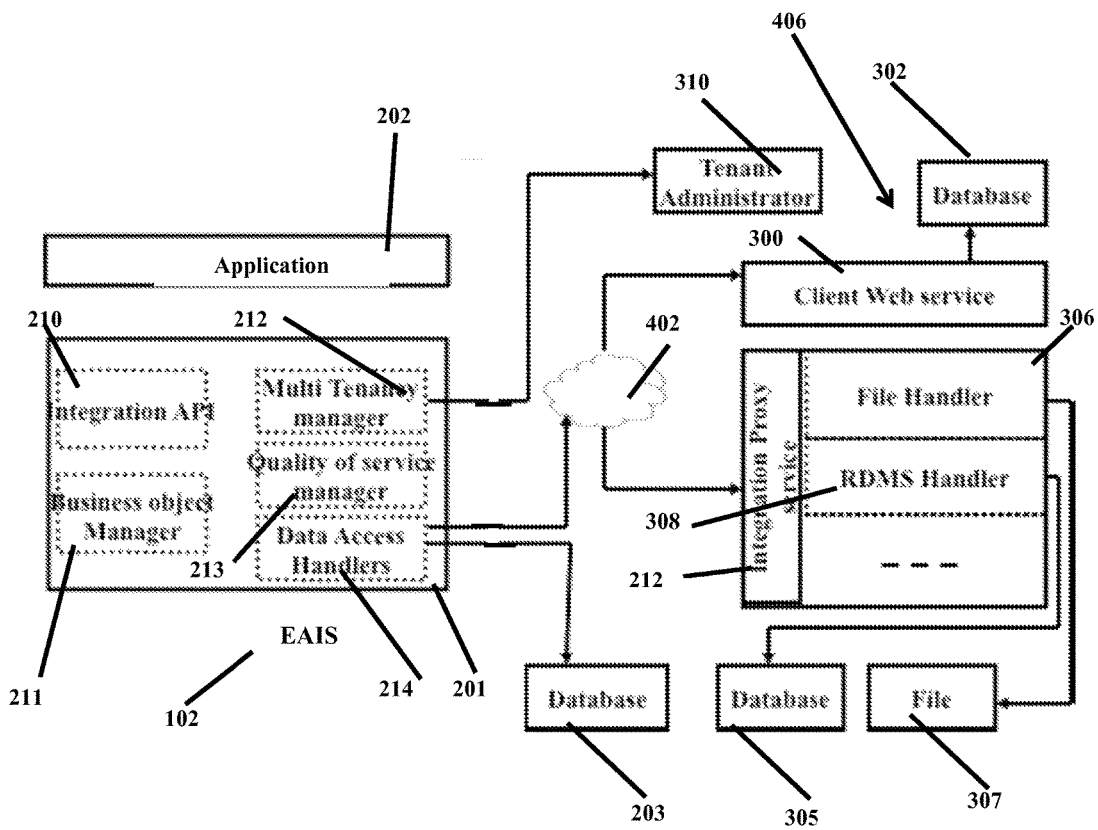
FIG. 3 is a block schematic diagram that shows another embodiment of the EAIS according to the invention.

FIG. 3 is a block schematic diagram that shows another embodiment of the EAIS according to the invention. The DAH can collect data by interacting with an information system 406 that includes client Web services 300 which, in turn, access a database 302. If an information system is remote from the DAH and lacks Web services or other interfaces for remote access, an integration proxy service 304 is installed that connects the DAH to the data sources 305 and 307 of this remote information system.

The EAIS is configurable with different protocols and can include custom made protocols; this enables the DAH, which is part of EAIS, to handle different data formats. The DAH interacts with different data sources which supply data in different data formats, such as a file 307 that is supplied by a file handler 306, an RDMS query format supplied by an RDMS handler 308, etc., and converts this data into a form suitable for the business objects.

Figure 4:
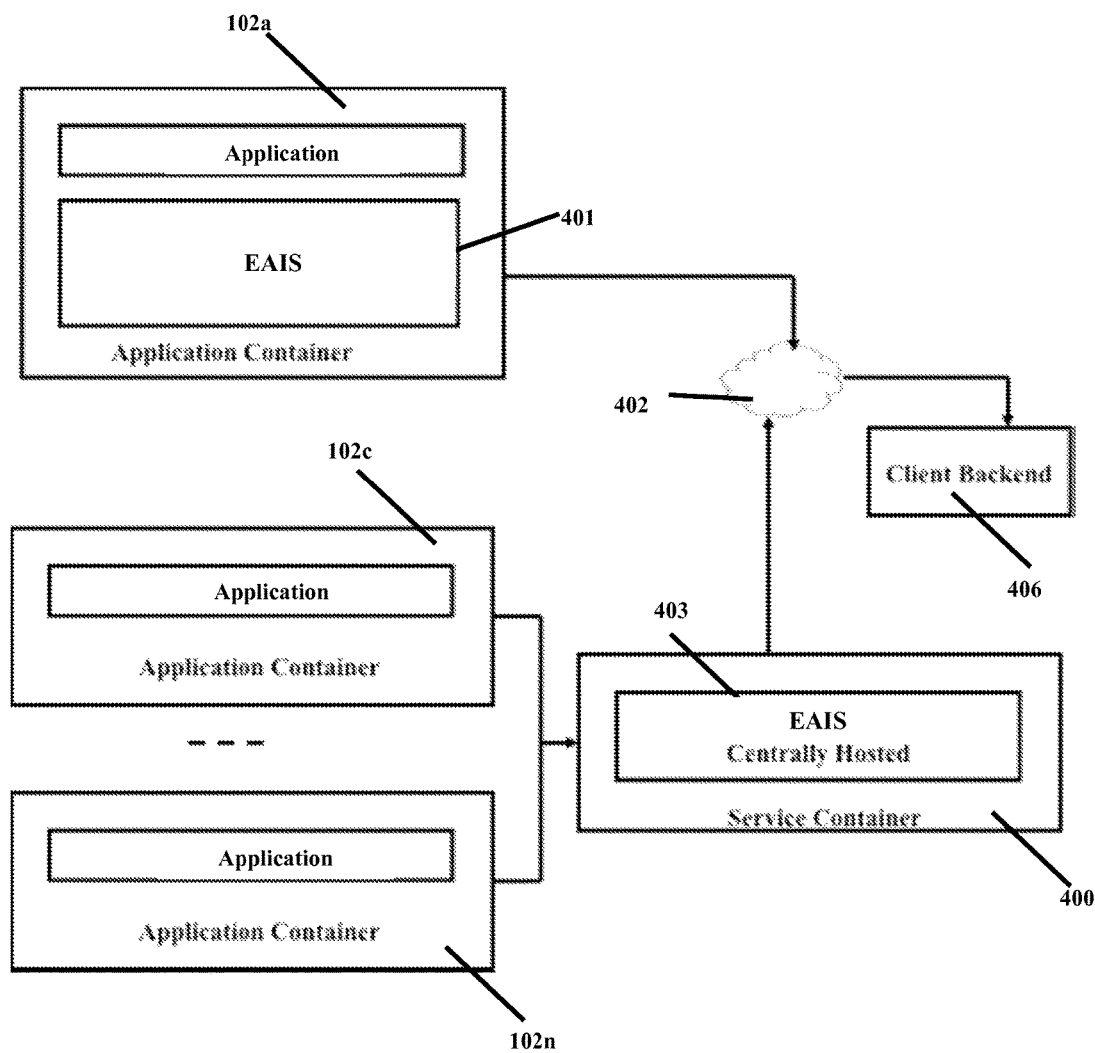
FIG. 4 is a block schematic diagram that shows different ways of deploying EAISs according to the invention.

FIG. 4 is a block schematic diagram that shows different ways of deploying an EAIS according to the invention. FIG. 4 shows the EAIS as embedded in an application container 102a according to one embodiment of the invention. FIG. 4 also shows the EAIS hosted as central service 400 for use by multiple applications 102c, . . . , 102n, according to another embodiment of the invention.

Figure 5:
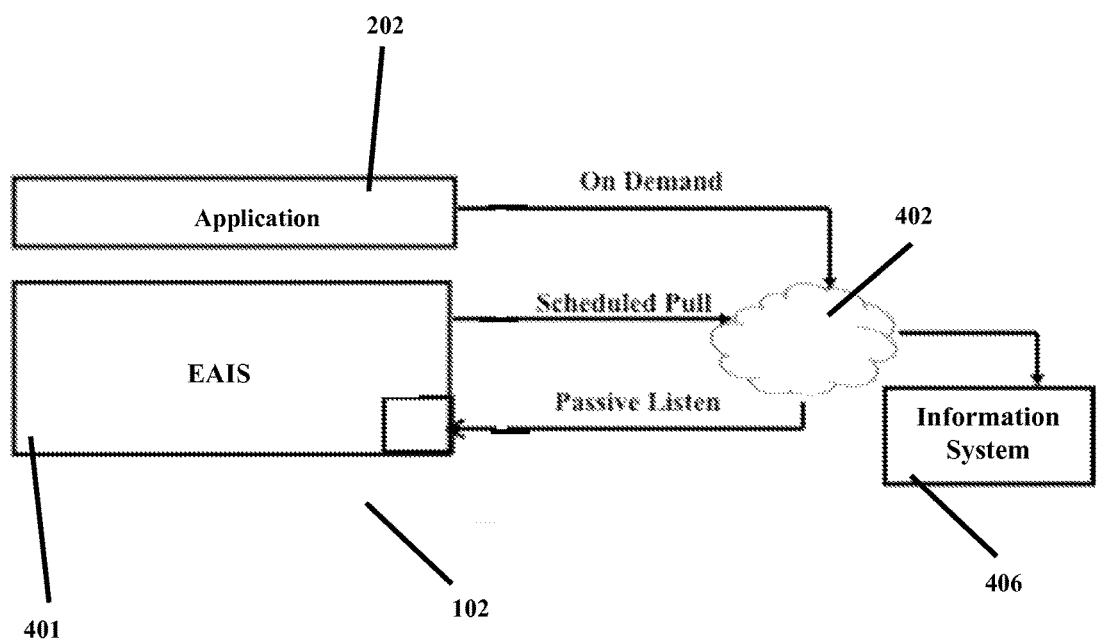
FIG. 5 is a block schematic diagram that shows different modes by which an EAIS retrieves data according to the invention.

FIG. 5 is a block schematic diagram that shows different modes by which an EAIS retrieves data according to the invention. In the On Demand mode, the EAIS retrieves data from the information system at the point when the application requests the data. In the Scheduled Pull mode, the EAIS retrieves information at predefined schedules and makes it available locally, in anticipation of future data requests from the application. In the Passive Listen mode, the enterprise information system itself pushes data to the EAIS based on a predefined condition, for example as and when a new entry or modification occurs.

Figure 6:
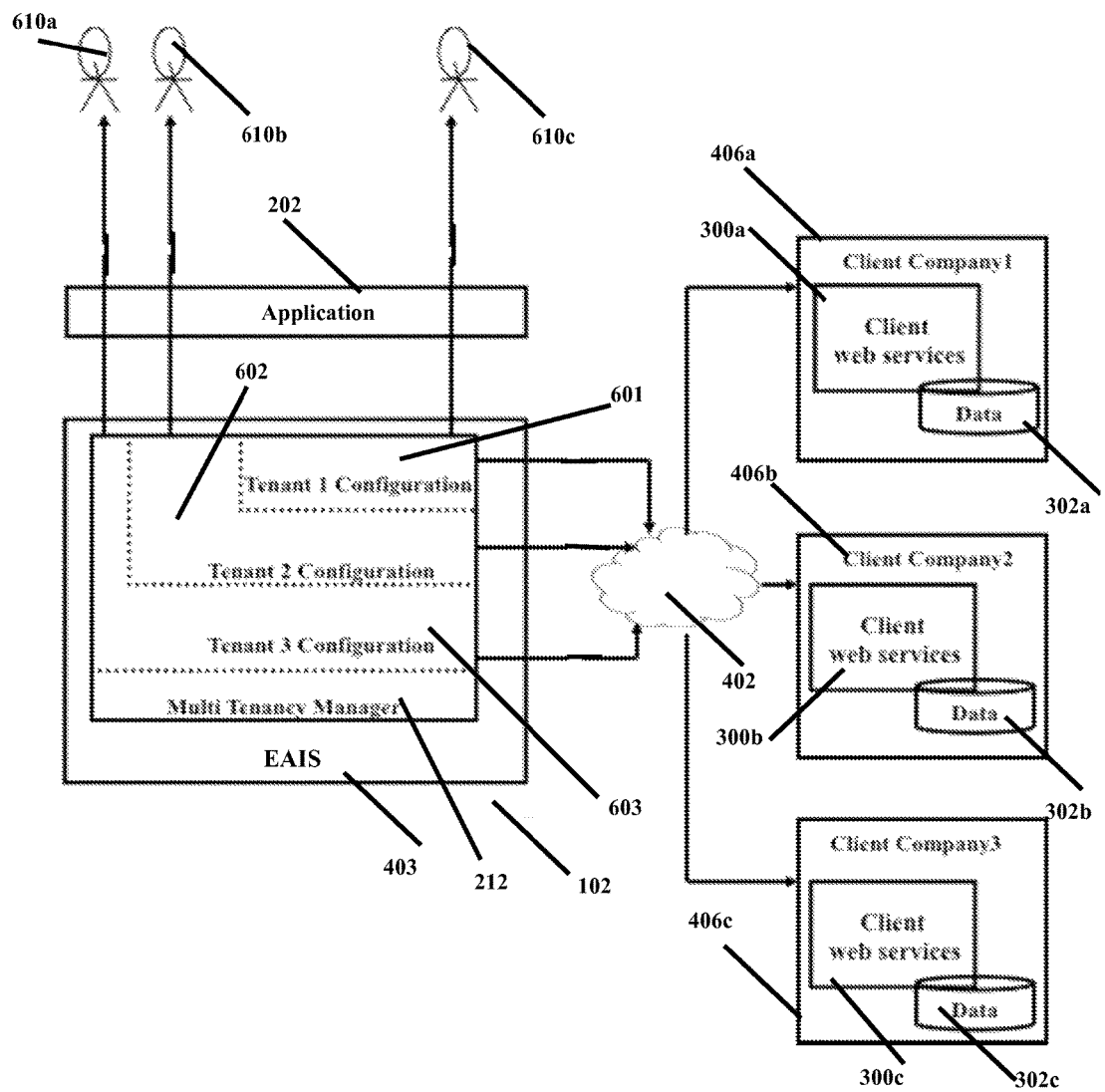
FIG. 6 is a block schematic diagram that shows functioning of multi-tenancy according to the invention.

FIG. 6 is a block schematic diagram that shows functioning of multi-tenancy according to the invention. A plurality of customers 610a, 610b, 610c access the multi-tenant manager 212 of the EAIS 403. The multi-tenant manager 212 contains tenant configurations for Tenant 1 (600), Tenant 2 (602), and Tenant 3 (603). Each tenant may correspond to a respective client company, for example Client Company 1 (406a) having client Web services 300a and a database 302a, Client Company 2 (406b) having client Web services 300b and a database 302b, and Client Company 3 (406c) having client Web services 300c and a database 302c. Thus, the customers may access any of the client companies via resort to the appropriate tenant configuration in the multi-tenancy manager.

For example, the following XML code shows a sample tenant configuration according to one embodiment of the invention. The tenant "tenant1" has one business object "Store" which is mapped to the relational database table "Store" that is accessible through a Java database (JDBC) connection:

```
<tenant name="tenant1">
    <provider name="ProviderA">
        <protocol name="protol" type="jdbc">
            <properties>
                <property name="connection.driver_class"
value="com.mysql.jdbc.Driver"/>
                <property name="connection.url"
value="jdbc:mysql://localhost/test"/>
                <property name="connection.username" value="root"/>
                <property name="connection.password" value="root"/>
            </properties>
            <dataformat name="df1" type="jdbc"/>
        </protocol>
        <object name="Store" appObject="Store" protocol="protol/">
    </provider>
</tenant>
```

Figure 7:
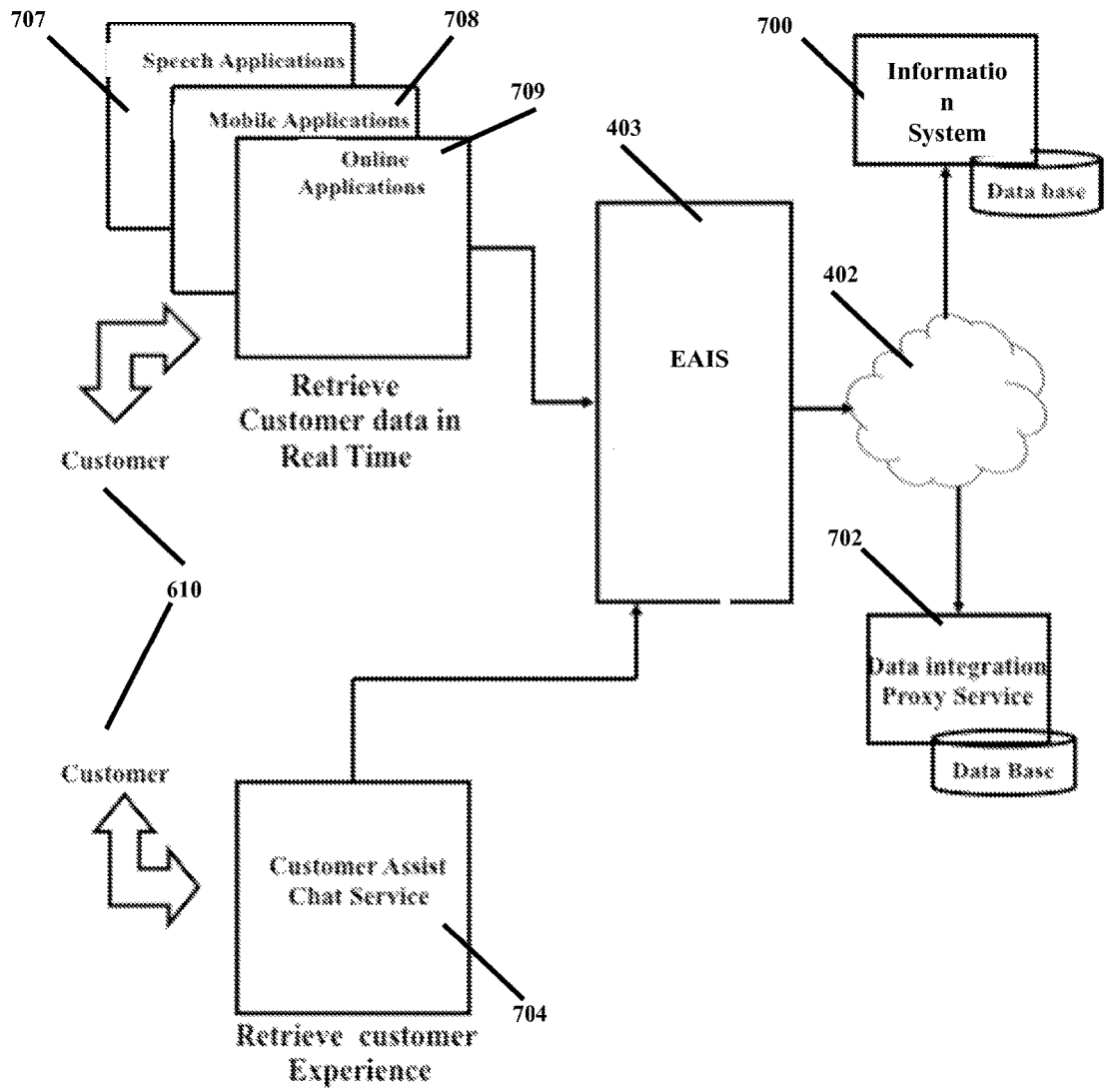
FIG. 7 is a block schematic diagram that shows a system according to another embodiment of the invention.

FIG. 7 is a block schematic diagram that shows a system according to another embodiment of the invention. In FIG. 7, multi-modal customer 610 conversations include customer interactions with appropriate applications for calls, e.g. speech applications 707; Web site visits, e.g. online applications 709; mobile-application sessions, e.g. mobile applications 708; customer chats; e.g. chat service 704. Customers from all interaction modes are connected to the EAIS 403. The EAIS interacts with information systems and their associated data sources 700 (see FIG. 6) or the data integration proxy services 702, fetches the data that is requested by applications, and presents it to the applications. In this embodiment of the invention, the QOS 213 (see FIG. 2) monitors data requests to the EAIS from interactions in a multi-modal conversation, where these interactions can include, for example: calls, Website visits, mobile application sessions, and customer chats.

Business objects are a high level abstraction of business entities, and they can be reused across applications.

The following XML code shows the definition of a business object according to one embodiment of the invention. The object "Store" has the following fields: a Store ID, an Enabled flag, a Store Name, and a Regular Schedule, i.e. a set of opening hours:

```
<xs:schema (namespace stuff not shown) >
    <xs:complexType name="Store">
        <xs:sequence>
            <xs:element name="storeId" type="xs:string"/>
            <xs:element name="enabled" type="xs:boolean" minOccurs="0"/>
            <xs:element name="storeName" type="xs:string"
minOccurs="0"/>
        </xs:sequence>
            <xs:element                    name="regularSchedules"
type="app:RegularSchedule" minOccurs="0"
            maxOccurs="unbounded"/>
    </xs:complexType>
    <xs:element name="Store" type="app:Store"/>
</xs:schema>
```

Business objects can be linked to an information system through a binding that defines how the data elements and operations of the business object map to data elements and operations of the information system. A business object may have separate bindings for each information system.

The following XML code shows the binding of a business object to the columns of a relational database table according to one embodiment of the invention. The business object "Store" maps to the table "store" and its fields map to columns as follows: the field "storeID" maps to the column "storeID"; the field "enabled" maps to the column "classifier_2":

```
<xs:schema
    <xs:complexType name="Store">
        <xs:annotation>
            <xs:appinfo><databinding table="store"></xs:appinfo>
        </xs:annotation>
        <xs:sequence>
        <xs:element name="storeId" type="xs:string">
            <xs:annotation>
                <xs:appinfo><databinding id="true"/></xs:appinfo>
            </xs:annotation>
        </xs:element>
        <xs:element name="enabled" type="xs:boolean" minOccurs="0">
            <xs:annotation>
                <xs:appinfo><databinding
                column="classifier_2"/></xs:appinfo>
            </xs:annotation>
        </xs:element>
        . . .
        </xs:sequence>
    </xs:complexType>
</xs:schema>
```

Figure 8:
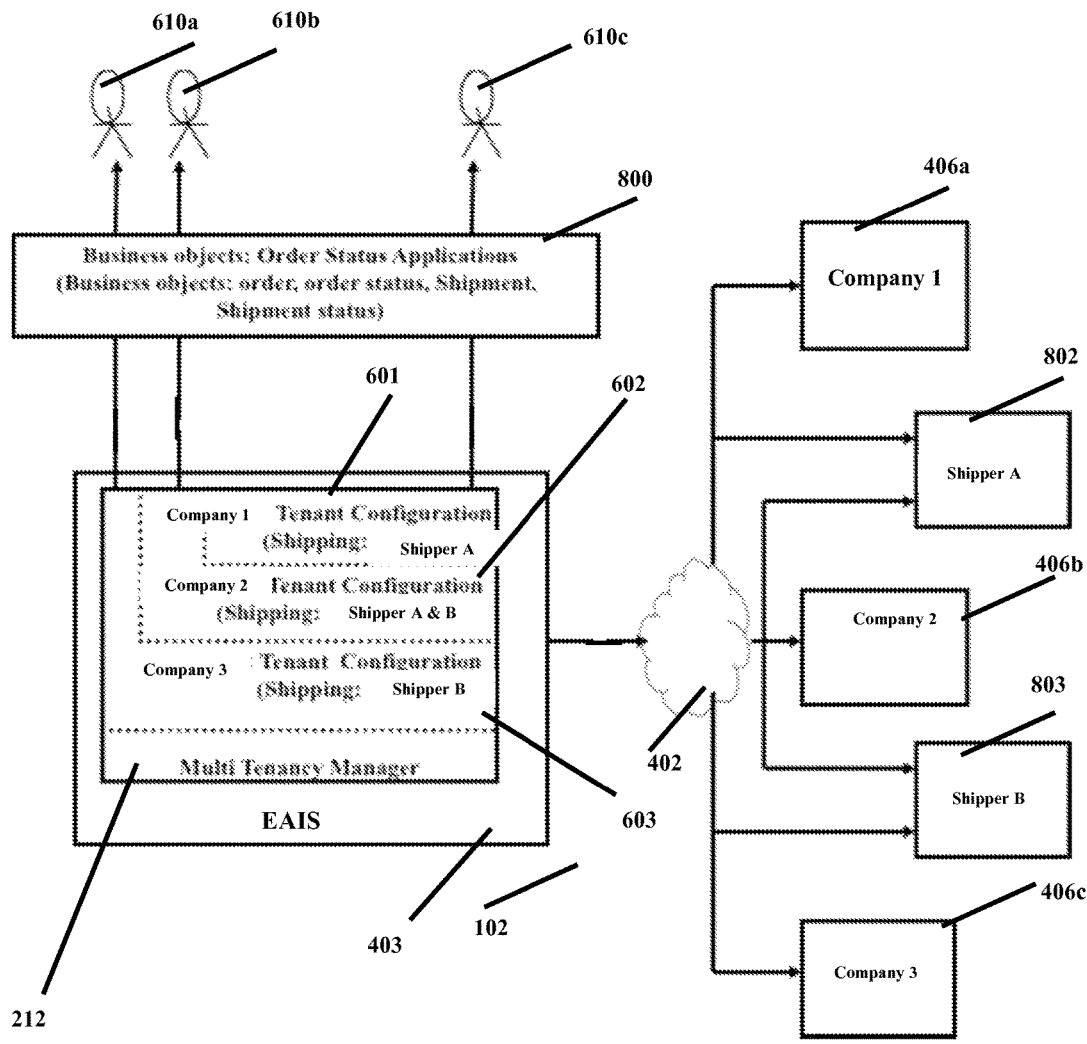
FIG. 8 is a block schematic diagram that shows a system for serving multiple tenants using common business objects according to the invention.

FIG. 8 is a block schematic diagram that shows a system for serving multiple tenants using common business objects according to the invention. Business objects are predefined and can be reused. In this example, the Order, Order Status, Shipment, and Shipment Status comprise the business objects. For each call from a customer 610a, 610b, 610c, the business object logic 800 identifies the tenant configuration to use to connect to the order status and shipping status services of the appropriate client and to use the appropriate business objects accordingly. If a call belongs to Company 1, then the system identifies that Shipper A is the shipping configuration and it connects to the Shipper A server using the business objects order status and shipment status. If call belongs to Company 2, then the system identifies that Shippers A and B comprise the shipping configuration and it connects to the Shipper A and/or B server using same business objects order status and shipment status. If call belongs to Company 3, then the system identifies that Shipper B is the shipping configuration and it connects to the Shipper B server using same business objects order status and shipment status.

Figure 9:
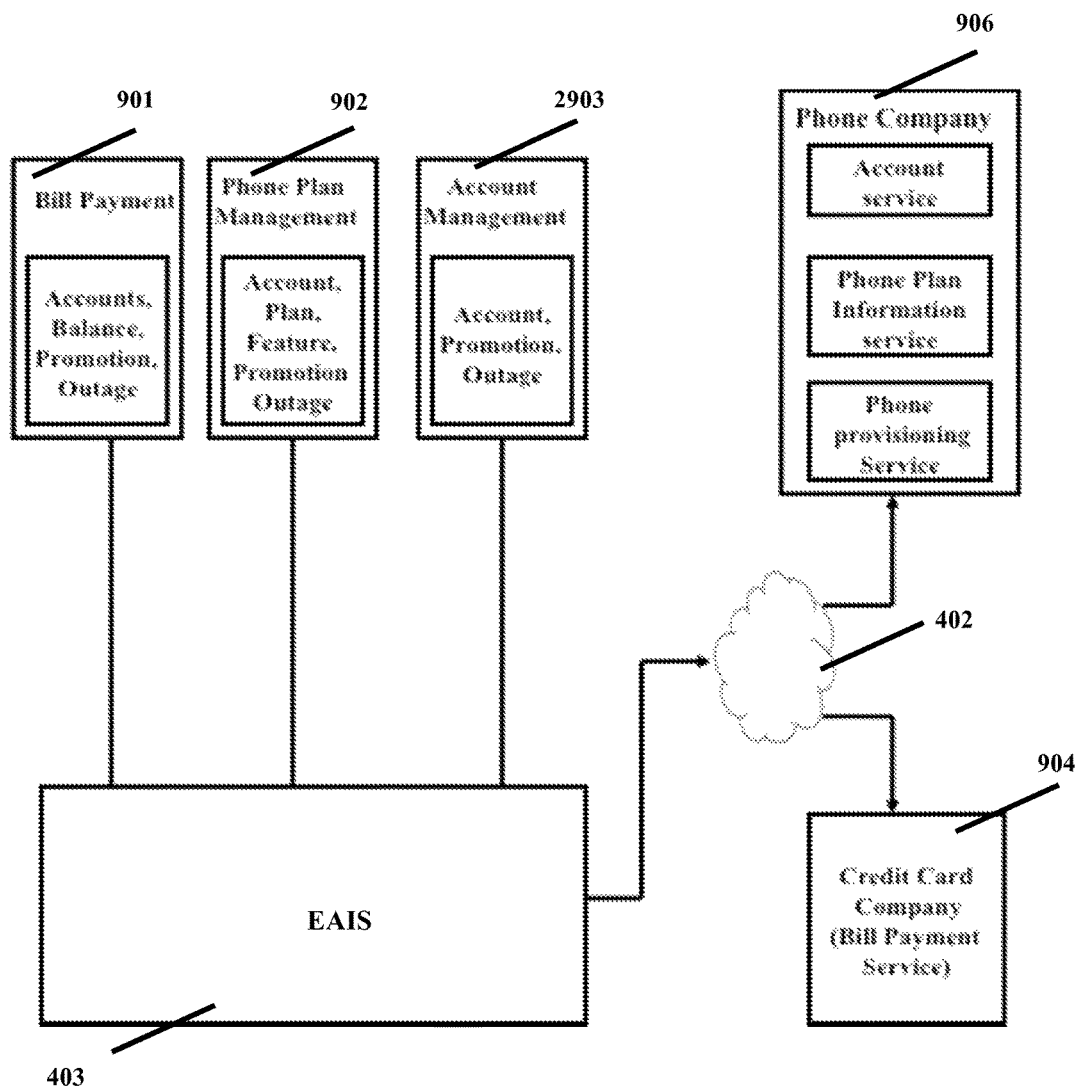
FIG. 9 is a block schematic diagram that shows a system for sharing the same resource among multiple tenants according to the invention.

FIG. 9 is a block schematic diagram that shows a system for sharing the same resource among multiple tenants according to the invention. In FIG. 9, a suite of telephone account management applications 901, 902, 903 all share common business objects and connect to multiple (some shared) client services via the EAIS 403. The Bill Payment application 901 allows the caller to pay bills via the phone; it connects to the credit card company 904 to do so. The Phone Plan Management application 902 allows one to add features to their phone plan, change their phone plan, etc. via connection to the phone company 906. The Account Management application 903 allows one to add a new line, change a password or address, etc. via connection to the phone company 906.

Figure 10:
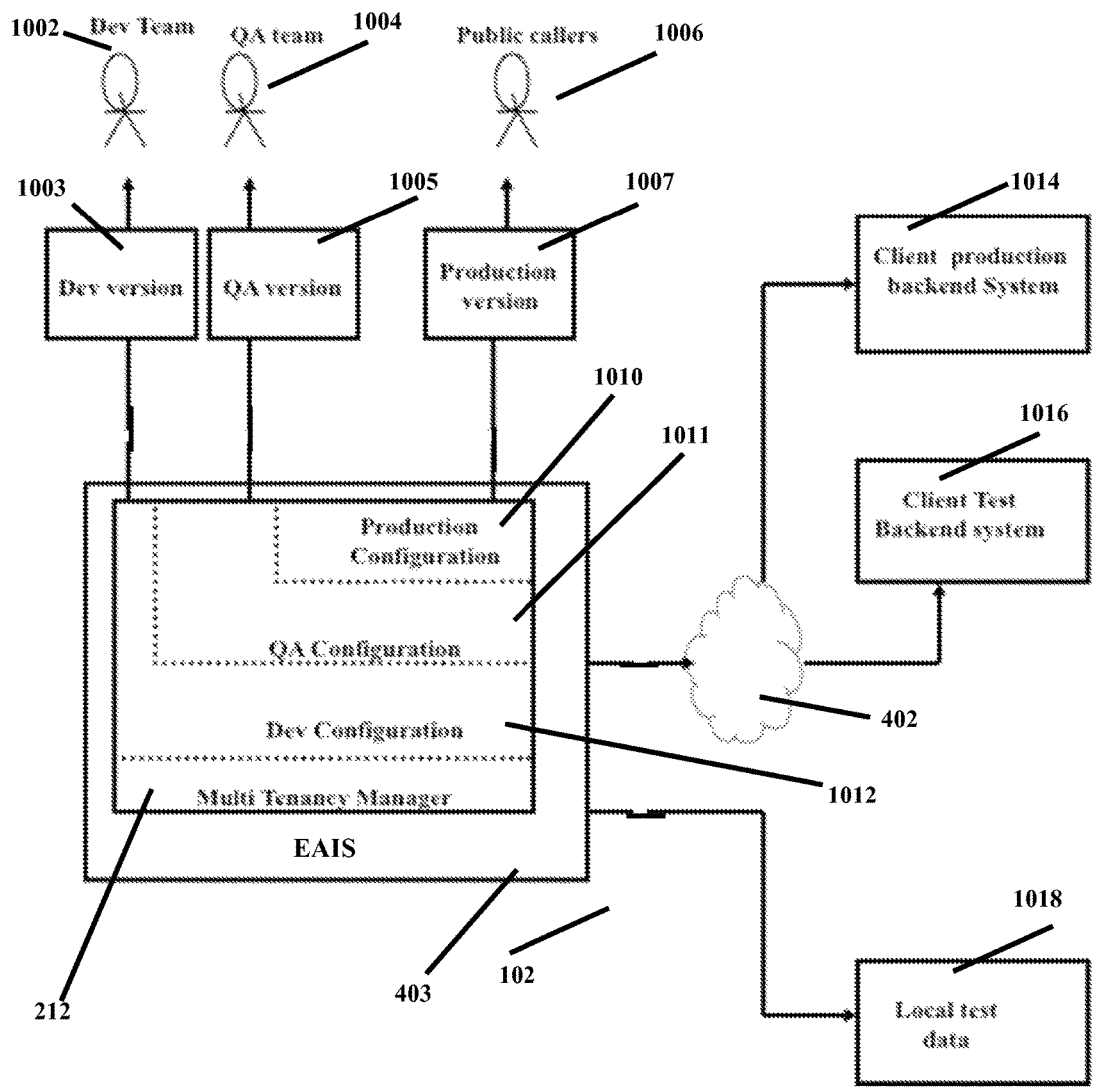
FIG. 10 is a block schematic diagram that shows a system in which multi-tenancy is used to support an application deployment in different environments during the application's lifecycle according to the invention.

FIG. 10 is a block schematic diagram that shows a system in which multi-tenancy is used to support an application deployment in different environments during the application's lifecycle according to the invention. In FIG. 10, multi-tenancy support is used to connect, e.g. the Dev version 1003, QA version 1005, and Production version 1007 to the correct set of backend services. For example, the development instance 1003 connects via the Dev configuration 1012 to a local data store 1018; the production instance 1007 that services live callers connects via the Production configuration 1010 to the Client production instances 1014; and the QA instance 1005 connects via the QA configuration 1011 to the Client Test Backend system 1016. Those skilled in the art will appreciate that this architecture is applicable to many other environments, and that this particular use is provided only for purposes of illustration, and not by way of limitation.

Computer Implementation

Figure 11:
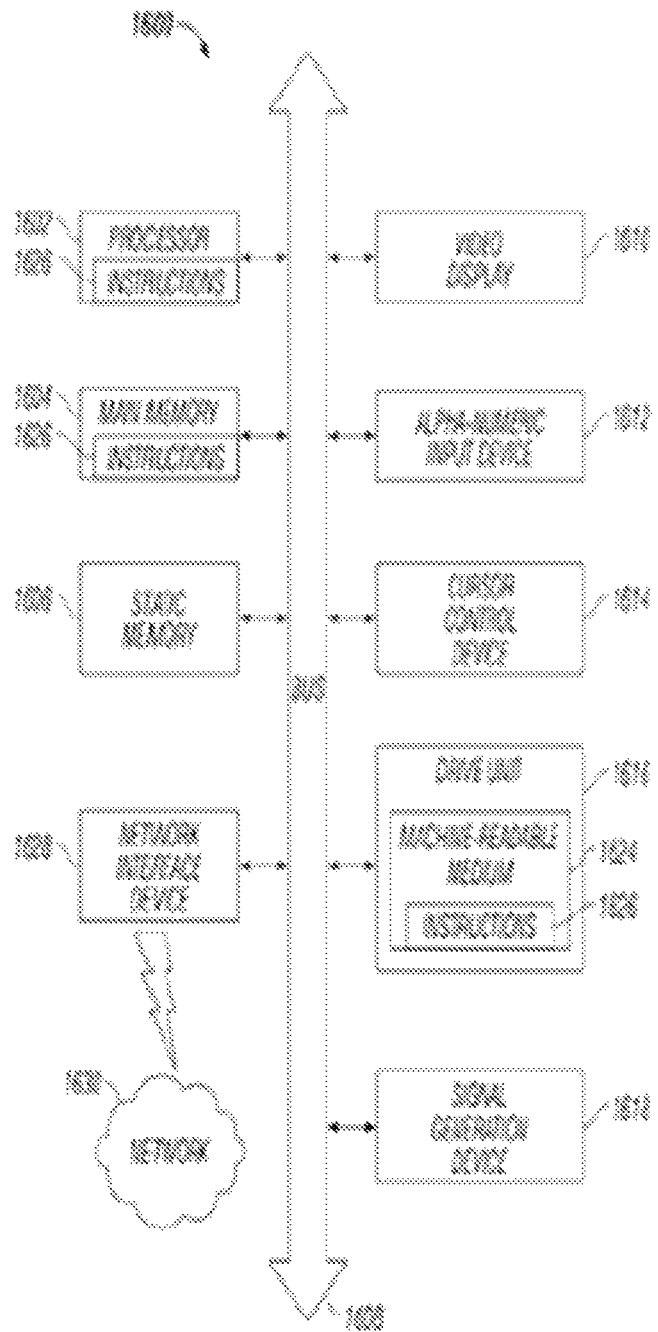
FIG. 11 is a block schematic diagram that shows a machine in the exemplary form of a computer system within which a set of instructions for causing the machine to perform any of the herein disclosed methodologies may be executed.

FIG. 11 is a block schematic diagram that depicts a machine in the exemplary form of a computer system 1600 within which a set of instructions for causing the machine to perform any of the herein disclosed methodologies may be executed. In alternative embodiments, the machine may comprise or include a network router, a network switch, a network bridge, personal digital assistant (PDA), a cellular telephone, a Web appliance or any machine capable of executing or transmitting a sequence of instructions that specify actions to be taken.

The computer system 1600 includes a processor 1602, a main memory 1604 and a static memory 1606, which communicate with each other via a bus 1608. The computer system 1600 may further include a display unit 1610, for example, a liquid crystal display (LCD) or a cathode ray tube (CRT). The computer system 1600 also includes an alphanumeric input device 1612, for example, a keyboard; a cursor control device 1614, for example, a mouse; a disk drive unit 1616, a signal generation device 1618, for example, a speaker, and a network interface device 1628.

The disk drive unit 1616 includes a machine-readable medium 1624 on which is stored a set of executable instructions, i.e., software, 1626 embodying any one, or all, of the methodologies described herein below. The software 1626 is also shown to reside, completely or at least partially, within the main memory 1604 and/or within the processor 1602. The software 1626 may further be transmitted or received over a network 1630 by means of a network interface device 1628.

In contrast to the system 1600 discussed above, a different embodiment uses logic circuitry instead of computer-executed instructions to implement processing entities. Depending upon the particular requirements of the application in the areas of speed, expense, tooling costs, and the like, this logic may be implemented by constructing an application-specific integrated circuit (ASIC) having thousands of tiny integrated transistors. Such an ASIC may be implemented with CMOS (complementary metal oxide semiconductor), TTL (transistor-transistor logic), VLSI (very large systems integration), or another suitable construction. Other alternatives include a digital signal processing chip (DSP), discrete circuitry (such as resistors, capacitors, diodes, inductors, and transistors), field programmable gate array (FPGA), programmable logic array (PLA), programmable logic device (PLD), and the like.

It is to be understood that embodiments may be used as or to support software programs or software modules executed upon some form of processing core (such as the CPU of a computer) or otherwise implemented or realized upon or within a machine or computer readable medium. A machine-readable medium includes any mechanism for storing or transmitting information in a form readable by a machine, e.g., a computer. For example, a machine readable medium includes read-only memory (ROM); random access memory (RAM); magnetic disk storage media; optical storage media; flash memory devices; electrical, optical, acoustical or other form of propagated signals, for example, carrier waves, infrared signals, digital signals, etc.; or any other type of media suitable for storing or transmitting information.

Although the invention is described herein with reference to the preferred embodiment, one skilled in the art will readily appreciate that other applications may be substituted for those set forth herein without departing from the spirit and scope of the invention. Accordingly, the invention should only be limited by the Claims included below.

The invention claimed is:

1. An apparatus for multi-tenant data integration, comprising:
   a processor configured to implement an enterprise application integration system (EAIS) for managing interactions between a plurality of applications and a plurality of information systems,
   wherein applications that access different information systems are simultaneously accommodated by the EAIS, each of said applications accessing only those information systems that are relevant to each application, and
   wherein said EAIS includes a data integration framework that comprises:
      an integration application programming interface (API) that enables the plurality of applications to independently interact with the plurality of information systems using business objects and logical operations assigned to said business objects,
         wherein each business object represents a generalization of data spread across multiple information systems in a standardized way, wherein the generalization enables applications associated with different tenants to independently access different information systems when calling a same business object, the same business object being associated with multiple sets of logical operations mapped to different physical operations specific to the different information systems, and wherein for each call for a given business object by a given application associated with a given tenant, a corresponding tenant configuration is identified, the corresponding tenant configuration allowing a connection to be formed between the given application and at least one information system having the data necessary to ensure the given business object is used appropriately by the given application for the given tenant;

a business object manager for defining the business objects prior to implementation by the integration API and maintaining the business objects in a business object repository;

a multi-tenancy manager that enables support of multiple applications associated with different tenants by making said EAIS adjustable per tenant, per application, and per information system;

a quality of service manager that periodically tests functionality of the plurality of information systems to determine operational performance and stores results of such testing for later use, said quality of service manager implementing a proactive heartbeat mechanism that allows an application to determine a priori whether an information system is reachable and prompts said application to adapt its behavior to avoid using said information system in response to determining said information system is unreachable, wherein said adaptation includes communicating with an alternate information system to access data that is not accessible from said information system; and one or more data access handlers for collecting data from the plurality of information systems, which include different data types, and converting said data into a format suitable for said business objects.

2. The apparatus of claim 1, further comprising:
said EAIS employing said multi-tenancy manager to support any of applications belonging to different companies having different business verticals and different companies having the same verticals.

3. The apparatus of claim 1, wherein said business objects are reused across the plurality of applications.

4. The apparatus of claim 1, further comprising:
said business object manager enabling new business objects to be created and added to the business object repository, and enabling existing business objects in the business object repository to be modified or deleted.

5. The apparatus of claim 1, further comprising:
said quality of service manager implementing rate limit access to a particular information system to prevent excessive rates of access that impact response time from said particular information system.

6. The apparatus of claim 1, further comprising:
said quality of service manager retrying an operation on a particular information system up to a specified limit if said particular information system fails to return a successful result to said operation.

7. The apparatus of claim 1, further comprising:
said one or more data access handlers collecting data by interacting with a particular information system; and when it is not possible to interact with the particular information system through a client Web service or remote interface, said one or more data access handlers employing an integration proxy service to interact with one or more remotely-located information systems.

8. The apparatus of claim 1, wherein said EAIS is any of:
embeddable in an application; and
hosted as a service for use by multiple applications.

9. The apparatus of claim 1, further comprising:
said EAIS implementing one or more mechanisms for retrieving data from a particular information system;
wherein said one or more mechanisms are adjustable on any of a per-business object, per-application, and per-tenant basis.

10. The apparatus of claim 9, further comprising:
when a data retrieval mechanism is On Demand, said EAIS retrieving data from the particular information system at the point when a particular application requests the data.

11. The apparatus of claim 9, further comprising:
when a data retrieval mechanism is Scheduled Pull, said EAIS retrieving data from the particular information system at predefined schedules; and
said EAIS making said retrieved data available locally in anticipation of future data requests from a particular application.

12. The apparatus of claim 9, further comprising:
when a data retrieval mechanism is Passive Listen, said particular information system pushing data to the EAIS based on a predefined condition; and
said EAIS making the data available locally in anticipation of future data requests from a particular application.

13. A computer-implemented method for serving multiple tenants using shared business objects, comprising:
providing a plurality of predefined business objects to be used by applications,
wherein each of said business objects includes multiple data elements,
wherein each of said business objects represents a generalization of enterprise data spread across multiple information systems in a standardized way, and
wherein the generalization enables applications associated with different tenants to independently access different information systems when calling a same business object using the data elements corresponding to the different information systems;
providing business object logic that represents a mapping of the multiple data elements of each business object to one or more information systems that support said business object;
mapping logical operations assigned to each business object by the multiple tenants to physical operations that are specific to each information system;
receiving, from an application associated with a tenant, a call for a particular business object;
identifying a tenant configuration corresponding to the tenant associated with the application, the tenant configuration specifying an information system that is to be queried by the particular business object,
wherein for each call for the particular business object by a given application associated with a given tenant, a corresponding tenant configuration is identified, the corresponding tenant configuration allowing a connection to be formed between the given application and at least one information system having the data necessary to ensure the particular business object is used appropriately by the given application for the given tenant;
connecting a service offered by the information system with the application that requires use of the service; and
enabling the application to utilize the service offered by the information system.

14. The method of claim 13, further comprising:
providing an enterprise application integration system (EAIS) with which said business object logic shares a same resource among multiple tenants;
wherein said multiple tenants share a common business object that connects said multiple tenants to a shared information system or distinct information systems.

15. The method of claim 13, wherein multi-tenancy is used to support an application deployment in different environments during the application's lifecycle.

16. The method of claim 13, further comprising:
receiving, from a second application, a call to the particular business object;
identifying a second tenant configuration for a second tenant associated with the second application, the second tenant configuration specifying a different information system that is to be queried by the particular business object;
connecting a service offered by the different information system with the second application that requires use of the service; and
enabling the second application to utilize the service offered by the different information system.

17. An apparatus for multi-tenant data integration, comprising:
a processor configured to implement an enterprise application integration system (EAIS) for managing interactions between a plurality of applications and a plurality of information systems;
wherein applications that access different information systems are accommodated simultaneously by the EAIS; and
wherein each of said applications accesses only those information systems that are relevant to each application;
said EAIS including a data integration framework that comprises:
an integration application programming interface (API) that enables the plurality of applications to interact with said plurality of information systems using business objects,
wherein each business object represents a generalization of data spread across multiple information systems in a standardized way,
wherein the generalization enables applications associated with different tenants to independently access different information systems when calling a same business object, the same business object being associated with multiple sets of logical operations mapped to different physical operations specific to the different information systems, and
wherein for each call for a given business object by a given application associated with a given tenant, a corresponding tenant configuration is identified, the corresponding tenant configuration allowing a connection to be formed between the given application and at least one information system having the data necessary to ensure the given business object is used appropriately by the given application for the given tenant;
a business object manager for defining the business objects prior to implementation by the integration API and maintaining the business objects in a business object repository;
a multi-tenancy manager that enables support of multiple applications associated with different end users by making said EAIS adjustable any of per end user, per application, and per information system;
a quality of service manager that periodically tests functionality of the plurality of information systems to determine operational performance and stores results of such testing for later use;
said quality of service manager implementing a proactive heartbeat mechanism that allows an application to determine a priori whether an information system is reachable and prompts said application to adapt its behavior to avoid using said information system in response to determining said information system is unreachable, wherein said adaptation includes communicating with an alternate information system to access data that is not accessible from said information system; and
one or more data access handlers for collecting data from the plurality of information systems, which include different data types, and converting said data into a format suitable for said business objects.

18. A computer-implemented method for multi-tenant data integration, comprising:
providing an enterprise application integration system (EAIS) for managing interactions between a plurality of applications and a plurality of information systems;
providing a multi-tenancy manager containing tenant configurations for two or more tenants, wherein each tenant corresponds to one or more applications, and wherein the tenant configurations are used by the EAIS to support the two or more tenants;
providing said one or more applications for each tenant with access to one or more information systems via an appropriate tenant configuration in said multi-tenancy manager;
wherein applications that access different information systems are accommodated simultaneously by the EAIS, and
wherein each of said applications accesses only those information systems that are relevant to each application; and
providing a business object manager that allows new business objects to be created and added to a repository, and that allows existing business objects in the repository to be modified or deleted,
wherein each business object represents a generalization of data spread across multiple information systems in a standardized way,
wherein the generalization enables applications associated with different tenants to independently access different information systems when calling a same business object, the same business object being associated with multiple sets of logical operations mapped to different physical operations specific to the different information systems, and
wherein for each call for a given business object by a given application associated with a given tenant, a corresponding tenant configuration is identified, the corresponding tenant configuration allowing a connection to be formed between the given application and at least one information system having the data necessary to ensure the given business object is used appropriately by the given application for the given tenant.

19. A computer-implemented method for serving multiple tenants using common business objects, comprising:
providing an enterprise application integration system (EAIS) for managing interactions between a plurality of applications and a plurality of information systems, said EAIS:
providing a business object repository for storing a plurality of business objects,
wherein each business object represents a generalization of data spread across multiple information systems in a standardized way,
wherein the generalization enables applications associated with different tenants to independently access different information systems when calling a same business object, the same business object being associated with multiple sets of logical operations mapped to different physical operations specific to the different information systems, and
wherein for each call for a given business object by a given application associated with a given tenant, a corresponding tenant configuration is identified, the corresponding tenant configuration allowing a connection to be formed between the given application and at least one information system having the data necessary to ensure the given business object is used appropriately by the given application for the given tenant; and
providing a data integration framework comprising:
an integration application programming interface (API) that enables said applications to interact with said information systems using said business objects and logical operations assigned to said business objects; and
a quality of service manager that periodically tests functionality of the plurality of information systems to determine operational performance and stores results of such testing for later use;
said quality of service manager configured to implement a proactive heartbeat mechanism that allows an application to determine a priori whether an information system is reachable and prompts said application to adapt its behavior to avoid using said information system in response to determining said information system is unreachable, wherein said adaptation includes communicating with an alternate information system to access data that is not accessible from said information system.

20. The method of claim 19, further comprising:
providing an interface for monitoring, and viewing quality and performance of, data requests made by said applications to said information systems through said EAIS.

21. The method of claim 19, wherein said applications comprise customer self-service applications, and further comprising:
said customer self-service applications using said business objects to interact with one or more information systems through said EAIS.

22. The method of claim 19, further comprising:
providing a discovery mechanism for rapidly discovering said business objects in the said business object repository of said EAIS.

23. The method of claim 19, said quality of service manager further configured to:
provide quality of service controls for data requests made through said EAIS that are adjustable on any of per-application, per-tenant, per business object, and per information system basis, via any of:
rate limit access;
retries;
the proactive heart-beat mechanism;
a time-out; and
a fail-over mechanism.

24. The method of claim 19, further comprising:
monitoring data requests made through EAIS from interactions in a multi-modal conversation, said interactions comprising any of calls, Web site visits, mobile application sessions, and customer chats.

25. The method of claim 24, further comprising:
monitoring and measuring quality of information systems being accessed in connection with calls, Web site visits, mobile application sessions, and customer chats.

26. The method of claim 19, further comprising:
providing a customer self-service application; and
using said customer self-service application concurrently for multiple clients;
wherein each client has multiple information systems.

27. The method of claim 19, further comprising:
providing an integration proxy service for connecting said applications to said information systems when said information systems lack Web services or other interfaces for remote access.

* * * * *

UNITED STATES PATENT AND TRADEMARK OFFICE
CERTIFICATE OF CORRECTION

PATENT NO.          : 10,255,344 B2
APPLICATION NO.     : 13/908948
DATED               : April 9, 2019
INVENTOR(S)         : Srinivasan Suresh Page 1 of 1

It is certified that error appears in the above-identified patent and that said Letters Patent is hereby corrected as shown below:

On the Title Page

Item (72) Inventor:
Change "Suresh Srinivasan"
To --Srinivasan Suresh--.

Signed and Sealed this
Twenty-second Day of October, 2019

Andrei Iancu
*Director of the United States Patent and Trademark Office*